(12) United States Patent
Ishida et al.

(10) Patent No.: US 9,097,306 B2
(45) Date of Patent: Aug. 4, 2015

(54) STEEL WIRE ROD FOR HIGH-STRENGTH SPRING EXCELLENT IN WIRE DRAWABILITY, MANUFACTURING METHOD THEREFOR, AND HIGH-STRENGTH SPRING

(75) Inventors: Tomonobu Ishida, Kobe (JP); Nao Yoshihara, Kobe (JP); Shuhei Kitamura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 364 days.

(21) Appl. No.: 13/813,961

(22) PCT Filed: Aug. 30, 2011

(86) PCT No.: PCT/JP2011/069664
§ 371 (c)(1),
(2), (4) Date: Feb. 4, 2013

(87) PCT Pub. No.: WO2012/029812
PCT Pub. Date: Mar. 8, 2012

(65) Prior Publication Data
US 2013/0127100 A1 May 23, 2013

(30) Foreign Application Priority Data
Aug. 30, 2010 (JP) ................. 2010-192836

(51) Int. Cl.
*B21B 1/16* (2006.01)
*B21F 35/00* (2006.01)
(Continued)

(52) U.S. Cl.
CPC .............. *F16F 1/021* (2013.01); *B21F 35/00* (2013.01); *C21D 8/06* (2013.01); *C21D 8/065* (2013.01);
(Continued)

(58) Field of Classification Search
CPC ............ B21B 1/16; B21B 3/00; B21F 35/00; C22C 38/18; C22C 38/34; C22C 38/38; C21D 2211/009; C21D 8/065; C21D 9/02; C21D 9/525; F16F 1/021; F16F 1/04

USPC ............ 148/333, 334, 503, 580; 420/90, 91, 420/104, 109, 110, 112; 29/896.9; 267/166
See application file for complete search history.

(56) References Cited

U.S. PATENT DOCUMENTS 5,508,002 A  4/1996 Kawaguchi et al.
5,846,344 A  12/1998 Kawaguchi et al.
(Continued)

FOREIGN PATENT DOCUMENTS

JP  5 7912  1/1993
JP  7 173577  7/1995
(Continued)

OTHER PUBLICATIONS

International Search Report Issued Nov. 22, 2011 in PCT/JP11/69664 Filed Aug. 30, 2011.

*Primary Examiner* — Helene Klemanski
(74) *Attorney, Agent, or Firm* — Oblon, McClelland, Maier & Neustadt, L.L.P.

(57) ABSTRACT

Provided are: a steel wire rod material for a high-strength spring, which does not undergo the increase in deformation resistance arising from the increase in hardness and can exhibit good wire-drawing processability and the like even when a heat treatment, which deteriorates productivity, is eliminated or a simplified and rapid heat treatment is employed instead; a useful method for producing the steel wire rod material for a high-strength spring; a high-strength spring produced using the steel wire rod material for a high-strength spring as a material; and others. This steel wire rod material for a high-strength spring is a steel wire rod material that has been hot-rolled already, and has a texture having a specified chemical composition and mainly composed of pearlite, wherein the average value ($P_{ave}$) of the pearlite nodule size numbers and the standard deviation ($P\sigma$) of the pearlite nodule size numbers fulfill the following formulae (1) and (2), respectively:

$$9.5 \leq P_{ave} \leq 12.0; \qquad (1)$$

and $$0.2 \leq P\sigma \leq 0.7 \qquad (2).$$

19 Claims, 3 Drawing Sheets

(51) Int. Cl.
*C22C 38/18* (2006.01)
*C22C 38/34* (2006.01)
*C22C 38/38* (2006.01)
*C21D 9/02* (2006.01)
*F16F 1/02* (2006.01)
*F16F 1/04* (2006.01)
*C21D 8/06* (2006.01)
*C21D 9/52* (2006.01)
*B21B 3/00* (2006.01)

(52) U.S. Cl.
CPC .. *C21D 9/02* (2013.01); *C21D 9/52* (2013.01); *C21D 9/525* (2013.01); *C22C 38/18* (2013.01); *C22C 38/34* (2013.01); *C22C 38/38* (2013.01); *F16F 1/04* (2013.01); *B21B 1/16* (2013.01); *B21B 3/00* (2013.01); *C21D 2211/009* (2013.01); *Y10T 29/49611* (2015.01)

(56) References Cited

U.S. PATENT DOCUMENTS

| | | | |
|---|---|---|---|
| 7,618,498 B2* | 11/2009 | Kochi et al. | 148/333 |
| 8,192,562 B2* | 6/2012 | Yoshihara | 148/330 |
| 2003/0079815 A1* | 5/2003 | Hata et al. | 148/598 |
| 2006/0048864 A1* | 3/2006 | Nagao et al. | 148/320 |
| 2009/0007998 A1 | 1/2009 | Kochi et al. | |
| 2009/0020189 A1 | 1/2009 | Yoshihara et al. | |
| 2009/0065105 A1 | 3/2009 | Kochi et al. | |
| 2009/0087336 A1* | 4/2009 | Nishida et al. | 420/91 |
| 2013/0022491 A1* | 1/2013 | Oura et al. | 420/90 |

FOREIGN PATENT DOCUMENTS

| | | |
|---|---|---|
| JP | 2761046 | 6/1998 |
| JP | 11 199977 | 7/1999 |
| JP | 11 315349 | 11/1999 |
| JP | 2007 231347 | 9/2007 |
| JP | 2009 45763 | 3/2009 |
| JP | 2009 68030 | 4/2009 |
| JP | 2010 132943 | 6/2010 |
| JP | 5121360 B2 | 11/2012 |

* cited by examiner

STEEL WIRE ROD FOR HIGH-STRENGTH SPRING EXCELLENT IN WIRE DRAWABILITY, MANUFACTURING METHOD THEREFOR, AND HIGH-STRENGTH SPRING

TECHNICAL FIELD

The present invention relates typically to: a steel wire rod for high-strength springs, which is used typically for valve springs of internal-combustion engines and suspension springs of automobiles and has satisfactory workability (e.g., wire drawability, preferably after-mentioned SV workability); a manufacturing method for the steel wire rod; and a high-strength spring obtained from the steel wire rod for high-strength springs. In particular, the steel wire rod for high-strength springs according to the present invention is a wire rod (steel wire rod) after hot rolling, which has satisfactory wire drawability (wire-drawing workability) even though the rod had a high tensile strength of 1050 MPa or more. The present invention also relates to a technique of eliminating the need for a heat treatment which is performed for improved workability in a secondary processing of the wire rod.

BACKGROUND ART

Severer and severer fuel economy standards have been recently made on automobiles to solve or mitigate environmental issues, and the need to enable low fuel consumption of automobiles has become urgent. Steels for use in automobiles should be developed so as to have higher strengths to meet strong demands for the weight reduction of automobile bodies and should have higher and higher strengths to meet severer and severer fuel economy standards to be set in future. Independently, demands have been made to develop high-strength and low-cost steels, due to stiffer market competition with development of emerging nations.

Exemplary springs for use in automobiles include valve springs used mainly in engines; and suspension springs used for cushioning vibrations transmitted from tires. For example, a valve spring may be manufactured by the following method. Initially, a steel ingot, which has been refined and bloomed so as to have a predetermined chemical composition, is hot-rolled into a round rod having a diameter of about 5.5 to about 8.0 mm, coiled into a coil, and cooled. The cooled coil is subjected to softening anneal at a temperature of around 700° C., and then subjected to a surface-shaving process to remove a decarburized region of the surface layer (this process is hereinafter also referred to as "SV process"). The resulting wire rod is subjected to a heat treatment (also called "patenting") for improved workability, in which the wire rod is heated to 900° C. or above to be once austenitized, and then immersed in a coolant such as a lead bath or salt bath held to a temperature of about 600° C. to allow the wire rod to undergo isothermal transformation. After having a dense pearlite structure by the action of the heat treatment, the wire rod is drawn to a desired diameter (a diameter of about 3 to 4 mm in the case of a valve spring). The resulting article is subjected to a quenching-tempering treatment for improved spring properties and then processed into a spring shape.

The heat treatment for inducing isothermal transformation has been believed to be necessary for preventing manufacturing troubles such as a break in the wire during processing. However, such heat treatments act as a bottleneck in manufacture and adversely affect the productivity. In particular, steels may have decreasing workability with increasing strengths, and to cover for this, heat treatments for improved workability are tend to be performed for longer durations. This is a significant cause to increase the cost of steel wire rods for high-strength springs. Among such heat treatments, the patenting may require several tens of hours to treat one 2-ton coil. For this reason, simplification of the heat treatment (e.g., performing the heat treatment for a shorter time) or complete omission of the heat treatment will give significant merit to manufacture.

In addition, the heat treatments naturally act as a $CO_2$ emission source. Among such heat treatments, the lead patenting using harmful lead places a large load on the environment. Specifically, demands are currently made to provide a steel wire rod for high-strength springs "having satisfactory workability even when the heat treatment is omitted or a simplified short-time heat treatment is employed instead," because omission or simplification of the heat treatment, when achieved, may hold promise of significant improvements in productivity, cost reduction, and reduction of load on the environment.

Some techniques of regulating or optimizing hot roll conditions have been proposed so as to improve workability of steel wire rods for springs. As used herein the term "workability" also refers to and includes break frequency (burnout rate) and die life in the surface-shaving process (SV process) and wire-drawing process which are working steps performed between rolling and quenching-tempering treatment (workability in the SV process is hereinafter also particularly referred to as "SV workability").

In relation to these techniques, Patent Literature (PTL) 1, for example, discloses manufacturing of a wire rod by hot-rolling a work at a heating temperature of 1000° C. or below, in which finish rolling is performed at a temperature of 1000° C. or below; forcedly cooling the work down to a temperature of 650° C. to 750° C.; coiling the work into a coil; and cooling the coil down to 600° C. at a cooling rate of 1° C. to 10° C. per second to give a wire rod. The resulting wire rod has a reduction of area of 40% or more and exhibits good wire drawability even though a heat treatment is omitted.

This technique is intended to suppress the generation of a supercooling structure and to obtain a fine pearlite structure. However, the presence of such a fine pearlite structure, when employed alone, is insufficient for improved workability of a high-strength steel wire rod having a tensile strength of 1050 MPa or more. With a reducing grain size of such fine perlite structure, a high-strength steel wire rod may disadvantageously have an increasing hardness, have inferior wire drawability, and become susceptible to a break contrarily. The technique employs forced cooling down to a temperature of 650° C. to 750° C. before coiling. However, if this process is applied to a steel wire rod for high-strength springs, the resulting steel wire rod may highly possibly have a larger deformation resistance to cause laying failure.

Independently, PTL 2 proposes a technique of densely coiling a wire rod after finish rolling into a coil so that the coil ring pitch is one tenth or less the ring diameter; and slowly cooling the coil. This technique is intended to reduce the hardness of the rolled rod and to enable a SV process of the as-rolled rod. This technique, however, may fail to give a steel wire rod having satisfactory workability, because grains become more and more coarse during slow cooling and have a larger variation in grain size, although the structure has a lower hardness. In addition, decarburization increasingly occurs during slow cooling to cause the product spring to have inferior quality.

CITATION LIST

Patent Literature

PTL 1: Japanese Patent No. 2761046
PTL 2: Japanese Unexamined Patent Application Publication (JP-A) No. H05-7912

SUMMARY OF INVENTION

Technical Problem

The present invention has been made to solve problems in the customary techniques, and an object thereof is to provide a steel wire rod for high-strength springs, which does not suffer from increasing deformation resistance due to increasing hardness and can exhibit satisfactory wire drawability (preferably satisfactory SV workability) even when a productivity-inhibitory heat treatment is omitted or a simplified short-time heat treatment is employed instead. Another object of the present invention is to provide a method useful for the manufacture of the steel wire rod for high-strength springs. Yet another object of the present invention is to provide a high-strength spring or another product from the steel wire rod for high-strength springs as a material. As used herein the term "simplification" refers to substitution of a treatment which can be performed within a shorter time and at lower cost for the customary heat treatment(s). Specifically, the term "simplification" refers to, for example, substitution of a high-speed continuous treatment typically using annealing or high-frequency heating for the patenting.

Solution to Problem

The present invention has achieved the objects and provides a steel wire rod for high-strength springs, which is a steel wire rod having been hot-rolled and exhibits excellent wire drawability. The steel wire rod includes C in a content of 0.4% to 0.8%; Si in a content of 0.5% to 2.5%; Mn in a content of 0.3% to 2.0%; and Cr in a content of 0.4% to 3.0% and further includes at least one element selected from the group consisting of V in a content of 0.05% to 0.5%, Nb in a content of 0.05% to 0.5%, Ni in a content of 0.1% to 2.0%, and Mo in a content of 0.1% to 0.5%, in mass percent, in which the steel wire rod further includes iron and inevitable impurities, the steel wire rod has a structure mainly including pearlite, the steel wire rod has an average Pave and a standard deviation Pσ of pearlite nodule size numbers, and Pave and Pσ respectively satisfy conditions specified by following Expressions (1) and (2). The steel wire rod for high-strength springs according to the present invention preferably has an average Vickers hardness HVave of 360 or less.

$$9.5 \leq Pave \leq 12.0 \tag{1}$$

$$0.2 \leq P\sigma \leq 0.7 \tag{2}$$

The steel wire rod for high-strength springs according to the present invention may effectively further include one or more other elements such as (a) Cu in a content of more than 0% and less than or equal to 0.7%; (b) Ti in a content of more than 0% and less than or equal to 0.5%; and (c) B in a content of more than 0% and less than or equal to 0.01%, according to necessity. The steel wire rod for high-strength springs can have further improved properties corresponding to such element(s) to be contained.

The steel wire rod for high-strength springs may be preferably manufactured by placing a steel wire rod having been hot-rolled on a cooling conveyor at a placing temperature of 750° C. to 950° C. while coiling the steel wire rod into a coil; rapidly and uniformly cooling the coil on the cooling conveyor down to a temperature of 750° C. or below at a cooling rate of 1° C. or more per second; and subsequently slowly cooling the coil down from slow-cooling starting temperatures in a range of 650° C. to 750° C. both in a coil-dense part and in a coil-sparse part.

In the method according to the present invention, the slow cooling is preferably performed in a slow-cooling zone at a cooling rate V of less than 1° C. per second, in which the cooling rate V is specified by following Expression (3). The steel wire rod preferably resides in the slow-cooling zone for a residence time t as specified in following Expression (3) of 30 seconds or longer:

$$V(° C./second) = (Tin - Tout)/t \tag{3}$$

wherein Tin represents a temperature (° C.) of the steel wire rod at an inlet of the slow-cooling zone; Tout represents a temperature (° C.) of the steel wire rod at an outlet of the slow-cooling zone; and t represents a slow-cooling zone residence time (second) of the steel wire rod.

A high-strength spring exhibiting desired properties may be obtained by forming the steel wire rod for high-strength springs according to the present invention as above into a spring through any one of the following steps (a), (b), and (c), or through the steps (a) and (b) in combination, or through the steps (a) and (c) in combination:

(a) the step of surface-shaving the steel wire rod without a heat treatment;

(b) the step of drawing the steel wire rod after the surface-shaving step without patenting; and (c) the step of subjecting the steel wire rod after the surface-shaving step to softening anneal or high-frequency heating, and drawing the resulting steel wire rod.

Advantageous Effects of Invention

The present invention suitably controls chemical compositions, suitably sets manufacturing conditions, and thus allows a material steel to have a structure mainly including pearlite and to have an average Pave and a standard deviation Pσ of pearlite nodule size numbers satisfying predetermined relational expressions. The present invention can thereby provide a steel wire rod for high-strength springs, which does not suffer from increasing deformation resistance due to increasing hardness and can exhibit satisfactory wire drawability and SV workability even when a productivity-inhibitory heat treatment is omitted or a simplified short-time heat treatment is employed. The steel wire rod for high-strength springs is very useful as materials for the manufacture of high-strength springs.

DESCRIPTION OF EMBODIMENTS

Figure 1:
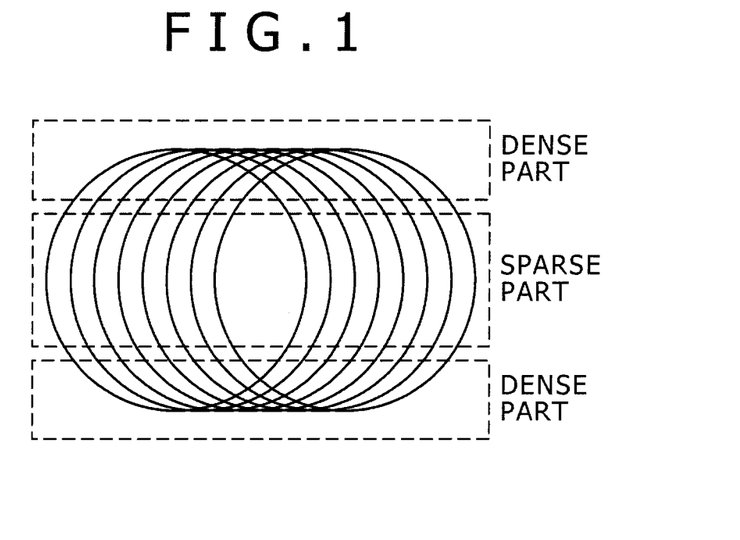
FIG. 1 is a schematic explanatory drawing illustrating how a coil is placed on a cooling conveyor.

Spring steel wire rods are generally manufactured by coiling a steel wire rod having been hot-rolled into a coil, placing the coiled steel wire rod on a cooling conveyor, and cooling the coiled steel wire rod typically by air blast cooling. How a coiled steel wire rod (hereinafter also simply referred to as a "coil") is placed on a cooling conveyor is illustrated in FIG. 1 as a schematic explanatory drawing. The coil in this state has a part where portions of the steel wire rod lie on each other relatively densely (this part is hereinafter also referred to as a "dense part") and a part where portions of the steel wire rod lie on each other relatively sparsely (this part is hereinafter also referred to as a "sparse part"). When the coil in this state is cooled, the dense part and the sparse part are cooled at different cooling rates and thereby have different structures after cooling. This tendency is significantly observed in high-strength spring steels having such high hardenability as to give an ideal critical diameter DI (mentioned later) of 240 mm or more.

The present inventors made investigations on relationship between the structure and the workability (wire-drawing workability, SV workability) of a steel wire rod (rolled rod) for high-strength springs. As a result, the present inventors found that the rolled rod, when controlled to have a structure mainly including fine and homogeneous pearlite, can have improved workability. Reduction in variation (unevenness) of the structure (grain size variation) in a longitudinal direction is more important than that in cross section of the wire rod, because the variation in the longitudinal direction, i.e., the variation caused by the coil-dense part and coil-sparse part is greater than the variation in the wire rod cross section (circular cross section) and affects the workability more significantly.

The present inventors also found that a structure, if becoming excessively fine and homogeneous, has an excessively high hardness contrarily and thereby has inferior workability instead. A steel wire rod for high-strength springs preferably has an average Vickers hardness HVave of 360 or less in a longitudinal direction of the wire rod so as to ensure sufficient workability, even when the heat treatment is omitted or a simplified short-time heat treatment is employed instead. The present inventors made further investigations on conditions for satisfying the requirements. As a result, a steel wire rod for high-strength springs, which meets the objects, can be obtained by allowing the steel wire rod to have a structure mainly including pearlite and to have an average Pave and a standard deviation Pσ of pearlite nodule size numbers each satisfying conditions specified by following Expressions (1) and (2). The present invention has been made based on these findings.

$$9.5 \leq Pave \leq 12.0 \quad (1)$$

$$0.2 \leq P\sigma \leq 0.7 \quad (2)$$

A steel wire rod having a standard deviation Pσ of more than 0.7 may possibly have undergone significantly uneven cooling in the manufacturing process thereof. Such a steel wire rod undergone significantly uneven cooling may include supercooling structures such as bainite (as well as martensite) and a coarse pearlite structure and disadvantageously have insufficient workability, as in Test No. 15 in experimental examples mentioned later. In contrast, a steel wire rod having a standard deviation Pσ of less than 0.2 (e.g., Test No. 13 in the experimental examples) may suffer from the local generation of supercooling structures and be disadvantageously liable to have a higher hardness (HVave).

The average Pave and standard deviation Pσ of pearlite nodule size numbers preferably satisfy the following conditions: $10.0 \leq Pave \leq 11.5$ and $0.3 \leq P\sigma \leq 0.6$. As used herein the term "structure mainly including pearlite" refers to such a structure as including pearlite in a content of 60 percent by area or more (preferably 80 percent by area or more, and most preferably 100 percent by area). The structure, even when partially containing ferrite, may not adversely affect the objects of the present invention.

Conditions for the manufacture of the steel wire rod for high-strength springs may also be suitably controlled. The steel wire rod for high-strength springs may be manufactured according to the following procedure. Initially, a steel billet having a predetermined chemical composition is hot-rolled to a desired wire diameter. A heating temperature upon the rolling is not limited, but is preferably a temperature as low as possible so as to have a fine structure. However, the steel, when hot-rolled at a low heating temperature, has an increased deformation resistance to place a larger load on facilities. To avoid this, the heating temperature may be suitably set depending on own facilities. Generally, hot rolling is performed at a heating temperature (steel billet heating temperature) of about 950° C. to about 1000° C.

Next, the steel wire rod having been hot-rolled is placed on a cooling conveyor while being coiled into a coil. If the temperature (placing temperature) in this process is above 950° C., the steel wire rod may have a coarse structure. If it is below 750° C., the steel may have increased deformation resistance to cause coiling condition failure. To avoid these, the placing temperature is set to 750° C. to 950° C. The placing temperature is preferably 775° C. or above and more preferably 800° C. or above, and preferably 925° C. or below and more preferably 900° C. or below.

After being placed on the cooling conveyor, the coiled steel wire rod is cooled down to a temperature range at which pearlite transformation starts (temperature of 750° C. or below). The wire rod as overlaid coil loops should be rapidly and uniformly cooled to control the structure after rolling (the structure of the steel wire rod, the structure of the rolled rod) within a predetermined range. Specifically, the coil-dense part and the coil-sparse part are cooled respectively at cooling rates of 1° C. or more per second, and temperatures of the wire rod both in the sparse part and dense part are controlled to be within the range of 650° C. to 750° C. The slow cooling is generally performed by arranging a slow-cooling cover on the cooling conveyor, and hereinafter the slow-cooling zone is also referred to as "inside the slow-cooling cover," and the slow cooling starting point is also referred to as a "slow-cooling cover inlet."

Control of the wire rod temperature at the slow-cooling cover inlet both in the sparse part and the dense part within the range of 650° C. to 750° C. can be performed by synthetically controlling the overlying pattern of the wire rod (coil) placed on the cooling conveyer and air quantities to be applied to the respective parts of the ring. Next, the coil is slowly cooled for transformation in the slow-cooling cover. The cooling rate V inside the slow-cooling cover is specified by following Expression (3) and is preferably less than 1° C. per second.

$$V(°C./second) = (Tin - Tout)/t \quad (3)$$

wherein Tin represents a temperature (° C.) of the steel wire rod at an inlet of the slow-cooling zone; Tout represents a temperature (° C.) of the steel wire rod at an outlet of the slow-cooling zone; and t represents a slow-cooling zone residence time (second) of the steel wire rod.

The arrangement of such a slow-cooling cover is also useful for suppressing the temperature variation in the wire rod to prevent local structural variation. However, if the residence time (slow-cooling zone residence time t, slow cooling time) inside the slow-cooling cover is excessively short, the slow cooling may terminate before the completion of transformation, and the steel wire rod may suffer from the generation of supercooling structures such as bainite and martensite as a result of the subsequent cooling (generally cooling with water). To avoid this, the residence time is preferably 30 seconds or longer. In a preferred embodiment of the present invention, a heater or an induction heating apparatus is arranged to perform cooling more slowly.

The chemical composition of the steel wire rod for high-strength springs according to the present invention should be suitably controlled to allow a final product (high-strength spring) to exhibit its properties. The ranges of respective compositions (elements) in the chemical composition are specified for the following reasons.

[C, 0.4% to 0.8%]

Carbon (C) element is effective for increasing strength and setting resistance after processing into a spring, and to exhibit these effects, carbon should be contained in a content of 0.4% or more. The spring has higher strengths and improved setting resistance with an increasing carbon content, but carbon in an excessively high content may cause the spring to have insufficient ductility/toughness. To avoid this, the carbon content should be 0.8% or less. The carbon content is preferably 0.5% or more in terms of its lower limit and 0.7% or less in terms of its upper limit.

[Si: 0.5% to 2.5%]

Silicon (Si) element is necessary for deoxidation of the steel and is dissolved in ferrite to effectively increase the strength of the steel. To exhibit these effects, Si should be contained in a content of 0.5% or more. However, Si, if present in an excessively high content, may lower the ductility/toughness and may increase decarburization and flaws on surface to adversely affect fatigue properties. To avoid these, the Si content should be 2.5% or less. The Si content is preferably 0.7% or more, more preferably 0.8% or more, and furthermore preferably 1.0% or more in terms of its lower limit, and is preferably 2.3% or less, more preferably 2.1% or less, and furthermore preferably 2.0% or less in terms of its upper limit.

[Mn: 0.3% to 2.0%]

Manganese (Mn) element is also necessary for deoxidation of the steel, as with Si, and increases the hardenability to contribute to improved strengths of the spring. To exhibit these effects, Mn should be contained in a content of 0.3% or more. However, Mn, if contained in an excessively high content, may prolong the transformation time and thereby impede the structural control through hot rolling. To avoid this, the Mn content should be 2.0% or less. The Mn content is preferably 0.35% or more, more preferably 0.40% or more, and furthermore preferably 0.50% or more in terms of its lower limit, and is preferably 1.8% or less, more preferably 1.6% or less, and furthermore preferably 1.2% or less in terms of its upper limit.

[Cr: 0.4% to 3.0%]

Chromium (Cr) element improves the spring strength and effectively reduces the activity of carbon to thereby prevent decarburization upon rolling and heat treatment and to prevent graphitization of carbides. To exhibit these effects, Cr should be contained in a content of 0.4% or more. However, Cr, if contained in an excessively high content, may lower the ductility/toughness. To avoid this, the Cr content should be 3.0% or less. The Cr content is preferably 0.45% or more, more preferably 0.50% or more, furthermore preferably 0.8% or more, and still more preferably 1.0% or more in terms of its lower limit, and is preferably 2.8% or less, more preferably 2.6% or less, and furthermore preferably 2.0% or less in terms of its upper limit.

[At Least One Element Selected from the Group Consisting of V in a Content of 0.05% To 0.5%, Nb in a Content of 0.05% to 0.5%, Ni in a Content of 0.1% to 2.0%, and Mo in a Content of 0.1% to 0.5%]

Vanadium (V), niobium (Nb), nickel (Ni), and molybdenum (Mo) elements effectively improve the ductility/toughness of the spring and the wire rod, and one or more of them, when contained, can exhibit these effects.

Among them, vanadium (V) effectively allows grains to be fine in the hot rolling and the quenching-tempering treatment, also effectively increases workability after rolling, and improves ductility/toughness of the spring. In addition, vanadium undergoes secondary precipitation hardening upon strain relief heat treatment after formation into a spring and thereby contributes to higher strengths of the spring. However, vanadium, if contained in excess, may form large carbides and nitrides as inclusions upon casting of the steel, and these inclusions may cause fatigue breakage to increase. To avoid this, the vanadium content may be 0.05% to 0.5%. The vanadium content is preferably 0.06% or more, more preferably 0.07% or more, and furthermore preferably 0.10% or more in terms of its lower limit, and is preferably 0.4% or less, more preferably 0.35% or less, and furthermore preferably 0.30% or less in terms of its upper limit.

Niobium (Nb) also effectively allows grains to be fine in the hot rolling and the quenching-tempering treatment, effectively increases workability after rolling, and improves ductility/toughness of the spring. However, Nb, if contained in excess, may exhibit saturated effects but may disadvantageously increase the steel cost. To avoid these, the Nb content may fall in the range of 0.05% to 0.5%. The Nb content is preferably 0.06% or more, more preferably 0.07% or more, and furthermore preferably 0.10% or more in terms of its lower limit, and is preferably 0.4% or less, more preferably 0.35% or less, and furthermore preferably 0.30% or less in terms of its upper limit.

Nickel (Ni) effectively increases ductility/toughness after the quenching-tempering treatment and effectively increases corrosion resistance. However, Ni, if contained in excess, may increase hardenability to prolong the transformation time, and this may impede the structural control through hot rolling. To avoid these, the Ni content may fall in the range of 0.1% to 2.0%. The Ni content is preferably 0.12% or more, more preferably 0.15% or more, and furthermore preferably 0.20% or more in terms of its lower limit, and is preferably 1.9% or less, more preferably 1.8% or less, furthermore preferably 1.5% or less, and still more preferably 1.2% or less in terms of its upper limit.

Molybdenum (Mo) effectively increases ductility/toughness after the quenching-tempering treatment and also effectively increases hardenability to contribute to higher strengths of the spring. However, Mo, if contained in excess, may excessively increase hardenability to impede structural control and may increase the steel cost. To avoid these, the Mo content may fall in the range of 0.1% to 0.5%. The Mo content is preferably 0.15% or more, and more preferably 0.20% or more in terms of its lower limit, and is preferably 0.4% or less in terms of its upper limit.

The steel wire rod for high-strength springs according to the present invention has basic compositions as mentioned above, and further includes iron and inevitable impurities (e.g., P and S). Where necessary, the steel wire rod for high-strength springs according to the present invention may further contain one or more other elements such as (a) Cu in a content of more than 0% and less than or equal to 0.7%; (b) Ti in a content of more than 0% and less than or equal to 0.5%; and (c) B in a content of more than 0% and less than or equal to 0.01%. The steel wire rod may have further improved properties according to the type of element(s) to be contained. Preferred contents of these elements are determined for the following reasons.

[Cu: More than 0% and Less than or Equal to 0.7%]

Copper (Cu) effectively suppresses decarburization and contributes to improved corrosion resistance. However, Cu, if contained in excess, may reduce hot ductility to invite risk of cracking upon hot rolling. To avoid this, the Cu content is preferably 0.7% or less. The content of Cu, when contained, is preferably 0.05% or more in terms of its lower limit, and is more preferably 0.6% or less in terms of its upper limit.

[Ti: More than 0% and Less than or Equal to 0.5%]

Titanium (Ti) forms carbides and nitrides to effectively allow the steel to have a fine structure. However, Ti, if contained in excess, may form coarse inclusions to cause early fatigue breakage. To avoid this, the Ti content is preferably 0.5% or less. The content of Ti, when contained, is preferably 0.01% or more in terms of its lower limit, and is more preferably 0.4% or less in terms of its upper limit.

[B: More than 0% and Less than or Equal to 0.01%]

Boron (B) has the function of increasing ductility/toughness. However, boron, if contained in excess, may precipitate as Fe—B composite compounds to cause cracking upon hot rolling. To avoid this, the boron content is preferably 0.01% or less. The content of boron, when contained, is preferably 0.0005% or more in terms of its lower limit, and is more preferably 0.008% or less in terms of its upper limit.

The steel wire rod for high-strength springs according to the present invention is intended to be a steel wire rod having been hot-rolled. This steel wire rod for high-strength springs may be basically worked and formed into a high-strength spring without a heat treatment, but may be subjected to a high-speed heat treatment (e.g., high-frequency heating). Specifically, the steel wire rod for high-strength springs according to the present invention may be subjected to any one of the following steps (a), (b), and (c), or the steps (a) and (b) in combination, or the steps (a) and (c) in combination, and then formed into a spring. The resulting spring may exhibit further satisfactory properties:

(a) the step of surface-shaving the steel wire rod without a heat treatment;

(b) the step of drawing the steel wire rod after the surface-shaving step without patenting; and (c) the step of subjecting the steel wire rod after the surface-shaving step to softening anneal or high-frequency heating, and drawing the resulting steel wire rod.

Wire rods obtained according to the present invention exhibit satisfactory workability even when worked through the step (a) or the step (b), or both. However, some wire rods undergoing cutting (shaving) upon the surface-shaving step may include a hardened zone in the surface layer thereof, and this may impede drawing. To avoid this, such steel wire rods are preferably subjected to the step (c) instead of the step (b). In the step (c), a heat treatment is performed after surface-shaving so as to soften the hardened zone in the surface layer, and this may effectively reduce the troubles such as a break upon drawing. Possible heat treatment procedures in this step include annealing and high-frequency heating, of which a treatment using high-frequency heating is preferred for high productivity.

EXAMPLES

The present invention will be illustrated in further detail with reference to several experimental examples below. It should be noted, however, that these examples are never construed to limit the scope of the invention; and various modifications and changes may be made without departing from the scope and sprit of the invention and should be considered to be within the scope of the invention.

Experimental Example 1

Steel ingots having chemical compositions given in following Table 1 were made in a converter and then bloomed into steel billets having a cross section of 155 mm by 155 mm. The steel billets were heated to 1000° C. and worked (hot-rolled) into round wires having a wire size of 5.5 to 8.0 mm in diameter. Ideal critical diameters DI are also indicated in Table 1, each of which was measured on a specimen cut from a sample steel billet by measuring and plotting a Jominy curve according to the method prescribed in Japanese Industrial Standard (JIS) G0561 and determining the ideal critical diameter DI according to following Expression (4) prescribed in American Society for Testing and Materials (ASTM) Standard A 255-02. The ideal critical diameters DI are indicated as referential values in the case of steels (e.g., Steels E and G) having chemical compositions out of the applicable range of the ASTM standard:

$$22.974+6.214[C]+356.364[C]^2-1091.488[C]^3+1464.88[C]^4-750.441[C]^5 \quad (4)$$

wherein [C] represents the carbon content (in mass percent) of the sample steel.

TABLE 1

| | Chemical compositions* (in mass percent) | | | | | | | | | | | |
|---|---|---|---|---|---|---|---|---|---|---|---|---|
| Steels | C | Si | Mn | Ni | Cr | V | Ti | Cu | Mo | B | Nb | DI (mm) |
| A | 0.65 | 2.4 | 1.2 | 0.2 | 2.5 | — | — | 0.5 | — | — | — | 755 |
| B | 0.67 | 1.5 | 1.0 | — | 0.5 | — | 0.03 | — | 0.4 | — | — | 286 |
| C | 0.48 | 1.9 | 0.5 | 0.3 | 1.6 | 0.2 | — | — | — | — | — | 244 |
| D | 0.42 | 1.2 | 1.0 | 0.8 | 1.0 | 0.3 | — | 0.1 | — | — | — | 284 |
| E | 0.80 | 0.6 | 1.8 | — | 3.0 | 0.5 | — | — | 0.2 | — | 0.2 | 1965 |
| F | 0.58 | 0.5 | 0.5 | 0.1 | 1.2 | 0.3 | — | — | 0.3 | — | — | 253 |
| G | 0.73 | 1.1 | 0.7 | — | 1.5 | — | — | — | 0.5 | — | — | 459 |
| H | 0.76 | 2.3 | 1.9 | 0.6 | 0.8 | — | 0.05 | — | — | — | 0.3 | 557 |

TABLE 1-continued

| | Chemical compositions* (in mass percent) | | | | | | | | | | |
|---|---|---|---|---|---|---|---|---|---|---|---|
| Steels | C | Si | Mn | Ni | Cr | V | Ti | Cu | Mo | B | Nb | DI (mm) |
| I | 0.61 | 1.8 | 2.0 | 1.0 | 1.3 | — | — | 0.3 | — | — | — | 793 |
| J | 0.54 | 2.5 | 1.0 | — | 1.7 | — | — | — | 0.4 | — | — | 774 |
| K | 0.40 | 2.0 | 0.8 | 0.1 | 1.0 | 0.1 | — | 0.1 | — | 0.002 | — | 247 |
| L | 0.60 | 2.2 | 0.5 | 0.2 | 2.0 | 0.2 | — | — | — | — | — | 346 |
| M | 0.90 | 2.0 | 0.5 | — | 1.5 | 0.1 | — | — | — | — | — | 259 |

*The remainder including iron and inevitable impurities

Next, coils having a unit weight of 2 ton (Test Nos. 1 to 21) were manufactured under manufacturing conditions given in following Table 2 and were examined on their structures, mechanical properties, and workabilities (SV workability and wire drawability).

As used herein the term "P nodule" refers to a region in which ferrite grains in the pearlite structure are in the same orientation. Such P nodules may be determined in the following manner. A sample wire rod is initially embedded typically in a resin and polished to expose the cross section to give a

TABLE 2

| | | | Conveyor | | | | Inside slow-cooling cover | | |
|---|---|---|---|---|---|---|---|---|---|
| | | Placing | Slow-cooling cover inlet temperature (Tin) (° C.) | | Cooling rate from placing to cover inlet (° C./sec) | | Cooling rate V (° C./sec) | | Slow-cooling time t (sec) (residence time |
| Test number | Steel | Rolled rod diameter (mm) | temperature after rolling (° C.) | Coil-dense part | Coil-sparse part | Coil-dense part | Coil-sparse part | Coil-dense part | Coil-sparse part | in slow-cooling zone) |
| 1 | A | 7.0 | 910 | 750 | 700 | 3.0 | 4.0 | 0.5 | 1.0 | 300 |
| 2 | B | 8.0 | 800 | 750 | 700 | 1.0 | 2.0 | 0.5 | 0.9 | 260 |
| 3 | C | 6.4 | 750 | 680 | 650 | 2.0 | 3.0 | 0.3 | 0.5 | 100 |
| 4 | D | 6.4 | 800 | 700 | 720 | 3.0 | 2.5 | 0.4 | 0.7 | 160 |
| 5 | E | 5.5 | 800 | 720 | 700 | 2.5 | 3.0 | 0.5 | 0.8 | 320 |
| 6 | F | 6.4 | 840 | 750 | 710 | 1.1 | 1.5 | 0.4 | 0.7 | 200 |
| 7 | G | 6.4 | 760 | 720 | 700 | 2.5 | 3.0 | 0.5 | 0.8 | 230 |
| 8 | H | 7.0 | 780 | 680 | 700 | 3.0 | 3.0 | 0.4 | 0.8 | 250 |
| 9 | I | 7.0 | 860 | 700 | 680 | 5.5 | 6.0 | 0.8 | 0.9 | 280 |
| 10 | J | 5.5 | 950 | 720 | 700 | 4.0 | 5.0 | 0.4 | 0.8 | 280 |
| 11 | K | 6.4 | 900 | 710 | 690 | 3.5 | 4.0 | 0.4 | 0.7 | 200 |
| 12 | L | 6.4 | 800 | 720 | 680 | 1.8 | 2.5 | 0.4 | 0.6 | 160 |
| 13 | L | 6.4 | 750 | 700 | 650 | 2.0 | 3.5 | Without slow-cooling cover | | |
| 14 | L | 5.5 | 700 | | | Coiling failure upon placing | | | | |
| 15 | L | 5.5 | 900 | 850 | 750 | 0.5 | 1.5 | 0.4 | 0.6 | 120 |
| 16 | L | 5.5 | 750 | 680 | 600 | 1.2 | 2.4 | 0.4 | 0.6 | 150 |
| 17 | L | 5.5 | 800 | 700 | 650 | 2.2 | 3.5 | 1.2 | 1.5 | 120 |
| 18 | L | 5.5 | 900 | 650 | 640 | 6.0 | 6.0 | 0.6 | 0.7 | 100 |
| 19 | L | 5.5 | 900 | 760 | 700 | 4.0 | 5.5 | 0.7 | 0.9 | 20 |
| 20 | L | 5.5 | 900 | 800 | 770 | 2.0 | 2.6 | 0.5 | 0.6 | 160 |
| 21 | M | 8.0 | 800 | 750 | 700 | 1.0 | 2.0 | 0.5 | 0.9 | 140 |

Figure 2:
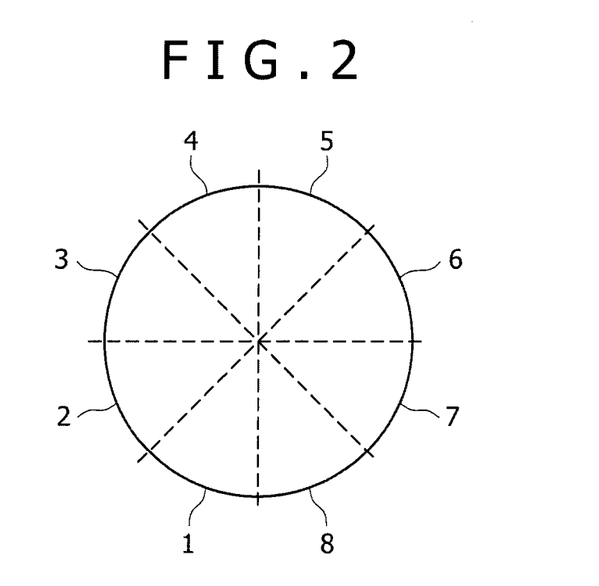
FIG. 2 is a view illustrating how to sample testing specimens.

The mechanical properties were evaluated in the following manner. Each one ring (loop) was cut from an end of a non-defective unit of each coil, circumferentially segmented into eight sections (corresponding to segmented in a wire rod longitudinal direction) as illustrated in FIG. 2 to give samples, the samples were straightened and subjected to tensile tests to measure a maximum tensile strength TS and a reduction of area RA. The measurement was performed once (n=1) in each test, and an average of measured values (average of measured values in the eight sections) was determined.

The structures were evaluated in the following manner. Structures in cross sections (axial sections; circular cross sections perpendicular to the rolling direction) of the eight-sectioned samples were respectively observed under an optical microscope; pearlite nodule (P nodule) size numbers of each cross section were measured in the surface layer and at positions of D/4 and D/2 deep (where D represents the diameter of the wire rod), and the average was defined as a P nodule size number Pi in the cross section in question (wherein "i" is an integer from 1 to 8); and an average Pave and a standard deviation Pa of P1 to P8 were calculated.

specimen (wire rod). The specimen is etched with a 1:100 (by volume) solution containing concentrated nitric acid (62%) and ethanol. As a result, P nodules are observed as emerged due to a difference in corrosion amount of ferrite grains with respect to the crystal face in the observation under an optical microscope, and size numbers of the P nodules are measured according to "Method of austenite grain size test" defined under JIS G 0551. Even in a sample having a mixed-phase structure of ferrite and pearlite, pro-eutectoid ferrite grains can be distinguished through etching as mentioned above. Accordingly, P nodules can be determined by excluding the area of pro-eutectoid ferrite in a sample, when having an area percentage of ferrite of 40% or less.

Vickers hardness HV of each cross section was measured in the following manner. The Vickers hardnesses HV were measured at four points separated each by 90° in a D/4 position, wherein D represents the diameter of the wire rod, and at one point at a D/2 position in the cross section of each of the eight-sectioned samples according to the method defined under JIS Z 2244, were averaged, and defined as a hardness HVi (i=1 to 8) of the cross section of each of the eight-sectioned samples; from which an average HVave of HV1 to HV8 was calculated.

Of the workabilities, SV workability was evaluated in the following manner. A sample coil was subjected to a surface-shaving step (SV process) without a heat treatment, and the SV workability was evaluated by the presence or absence of a break in the SV process, the dimensional tolerance of the wire diameter after surface shaving, and appearance inspection. Wire drawability was evaluated by drawing a 2-ton coil after the SV process and determining a critical reduction of area (critical reduction of area in wire drawing) at which a break occurs.

The wire drawability was evaluated for Test Nos. 1 to 12 also by determining a break frequency (discussion thereof is indicated in Experimental Example 2 below). Specifically, five 2-ton coils for each of Test Nos. 1 to 12 were subjected to surface-shaving (SV), drawn to a diameter of 4.5 to 2.5 mm after SV without a heat treatment, and the number of break(s) (break frequency) occurred upon wire drawing was determined.

The evaluation results together with the rolled rod structures are indicated in Table 3 below.

thereby underwent insufficient slow cooling during transformation, and suffered from the generation of an excessively fine P structure (with formation of bainite). The resulting steel wire rod had a higher hardness, underwent insufficient cutting (shaving) after the SV process to suffer from thickening, and had a low critical reduction of area in wire drawing.

The sample of Test No. 14 satisfied the conditions in chemical composition (Steel L), but had been manufactured under a condition out of the range specified in the present invention (at a placing temperature of 700° C.), thereby suffered from coiling failure upon placing, and failed to give a coil.

The sample of Test No. 15 satisfied the conditions in chemical composition (Steel L), but underwent insufficient rapid cooling (quenching) down to the slow-cooling cover (slow-cooling zone), thereby suffered from a coarse structure with a large structural variation, and locally included hard portions, such as bainite, formed partially in the surface layer. The resulting steel wire rod did not enjoy uniform cutting (shaving) in the SV process and suffered from "black scale" in which part of surface layer scale remained. The steel wire rod had a low critical reduction of area in wire drawing of less than 10%.

TABLE 3

| Test number | Steel | Rolled rod structure** Coil-dense part | Coil-sparse part | P nodules ave | P nodules σ | Average hardness HVave (HV) | Tensile strength TS of rolled rod (MPa) | Reduction of area RA of rolled rod (%) | SV workability | Heat treatment after SV process | Critical reduction of area in wire drawing (%) | Break frequency (number per 10 tons) |
|---|---|---|---|---|---|---|---|---|---|---|---|---|
| 1 | A | P | P | 9.5 | 0.6 | 341 | 1080 | 36 | ○ | None | >70 | 3 |
| 2 | B | P | P | 10.1 | 0.4 | 352 | 1261 | 38 | ○ | None | >70 | 3 |
| 3 | C | P | P | 10.8 | 0.3 | 354 | 1187 | 48 | ○ | None | >70 | 3 |
| 4 | D | P | P | 10.4 | 0.7 | 336 | 1154 | 45 | ○ | None | >70 | 2 |
| 5 | E | P | P | 10.6 | 0.6 | 347 | 1209 | 49 | ○ | None | >60 | 2 |
| 6 | F | P | P | 11.1 | 0.4 | 352 | 1226 | 49 | ○ | None | >70 | 2 |
| 7 | G | P | P | 10.1 | 0.5 | 339 | 1164 | 47 | ○ | None | >70 | 2 |
| 8 | H | P | P | 10.8 | 0.6 | 342 | 1167 | 48 | ○ | None | >70 | 3 |
| 9 | I | P | P | 11.8 | 0.2 | 357 | 1257 | 47 | ○ | None | 67 | 4 |
| 10 | J | P | P | 10.6 | 0.2 | 346 | 1209 | 49 | ○ | None | >60 | 1 |
| 11 | K | P | P | 10.5 | 0.3 | 342 | 1189 | 50 | ○ | None | >70 | 2 |
| 12 | L | P | P | 11.5 | 0.3 | 359 | 1226 | 50 | ○ | None | >70 | 2 |
| 13 | L | P | P + B | 12.8 | 0.1 | 385 | 1361 | 31 | Thickening | None | 15 | — |
| 14 | L | | | | | | Coiling Failure Upon Placing | | | | | |
| 15 | L | P + B | P | 8.5 | 1.1 | 340 | 980 | 30 | Black scale | None | <10 | — |
| 16 | L | P | P + B | 12.6 | 0.5 | 391 | 1401 | 27 | Break | None | <10 | — |
| 17 | L | P | P | 12.3 | 0.1 | 378 | 1305 | 32 | Thickening | None | 36 | — |
| 18 | L | P | P | 11.3 | 0.1 | 384 | 1280 | 34 | Thickening | None | 41 | — |
| 19 | L | P | P | 9.5 | 0.9 | 348 | 1031 | 30 | Break | None | <10 | — |
| 20 | L | P | P | 8.3 | 0.6 | 351 | 977 | 28 | Black scale | None | 21 | — |
| 21 | M | P | P | 10.3 | 0.9 | 386 | 1361 | 31 | Break | None | <10 | — |

**P: pearlite, B: bainite

In Table 3, samples of Test Nos. 1 to 12 satisfy conditions specified in the present invention, samples of Test Nos. 13 to 20 satisfy the conditions in chemical composition (Steel L), but do not satisfy manufacturing conditions specified in the present invention; and sample of Test No. 21 has a chemical composition out of the ranges specified in the present invention.

These results indicate as follows. The steel wire rods of Test Nos. 1 to 12 each include P nodules having a fine pearlite structure satisfying the conditions specified by Expressions (1) and (2), are soft as having an average Vickers hardness HVave of 360 or less, and exhibit satisfactory results both in wire drawability and SV workability.

The sample of Test No. 13 had been manufactured without arranging a slow-cooling cover (without slow cooling), The sample of Test No. 16 satisfied the conditions in chemical composition (Steel L), but underwent slow cooling at a low slow-cooling cover inlet temperature, thereby suffered from the generation of an excessively fine structure (with the formation of bainite), and had a high hardness. The resulting steel wire rod suffered from break upon the SV process and also suffered from breaks in early stages in wire drawing with a critical reduction of area in wire drawing of less than 10%.

The sample of Test No. 17 satisfied the conditions in chemical composition (Steel L), but underwent insufficient slow cooling inside the slow-cooling cover (at an excessively high cooling rate), suffered from excessively fine P nodules, and thereby had a high hardness. The resulting steel wire rod underwent insufficient cutting (shaving) upon the SV process to suffer from thickening, and had a low critical reduction of area in wire drawing of 36%.

The sample of Test No. 18 had a Pave within the specified range, but had an excessively small PG, and thereby had a high hardness. The resulting steel wire rod underwent insufficient cutting (shaving) upon the SV process to suffer from thickening, and had a low critical reduction of area in wire drawing of 41%.

The sample of Test No. 19 underwent slow cooling at a high dense part temperature at the slow-cooling cover inlet and thereby suffered from a coarse pearlite structure in the dense part with a large structural variation. The resulting steel wire rod underwent breaks upon the SV process and suffered from breaks in early stages of wire drawing with a critical reduction of area in wire drawing of less than 10%.

The sample of Test No. 20 underwent insufficient rapid cooling down to the slow-cooling zone (slow-cooling cover) both in the coil-dense part and the coil-sparse part and thereby suffered from a coarse structure including a coarse pearlite structure. The resulting steel wire rod failed to undergo uniform cutting (shaving) in the SV process to suffer from the generation of "black scale" and had a low critical reduction of area in wire drawing of 21%.

The sample of Test No. 21 employed a steel having a high carbon content of 0.90% (Steel M in Table 1), thereby had a high average Vickers hardness HVave, suffered from breaks upon the SV process, and had a low critical reduction of area in wire drawing of less than 10%.

Figure 3:
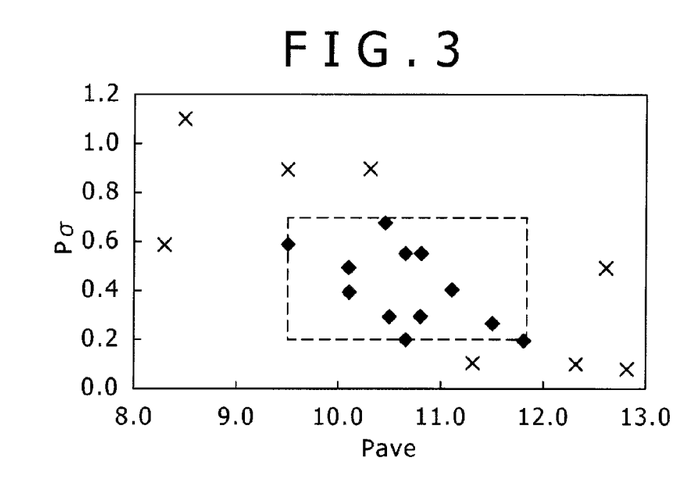
FIG. 3 is a graph illustrating a relationship between an average Pave and a standard deviation Pσ of pearlite nodule size numbers.
Figure 4:
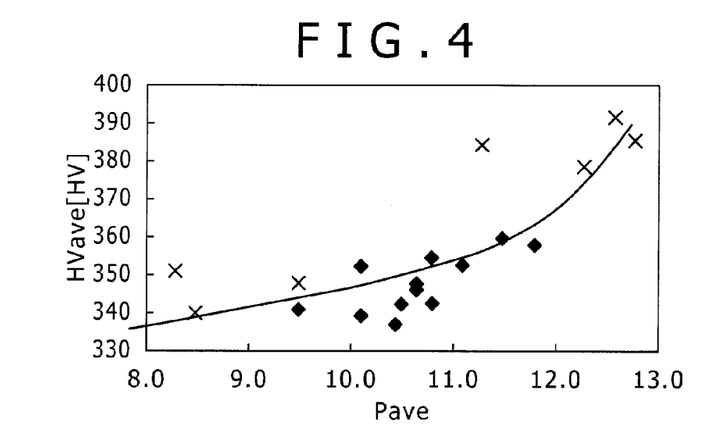
FIG. 4 is a graph illustrating how an average Vickers hardness HVave varies depending on the average Pave of pearlite nodule size numbers.
Figure 5:
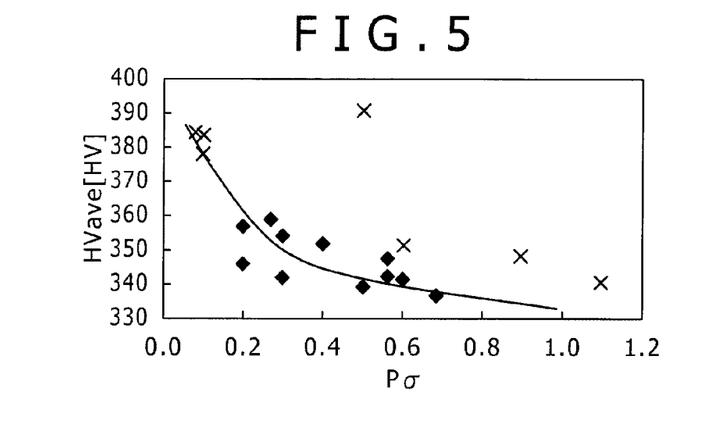
FIG. 5 is a graph illustrating how the average Vickers hardness HVave varies depending on the standard deviation Pσ of pearlite nodule size numbers.

Based on these results, FIG. 3 illustrates the relationship between the average Pave and the standard deviation Pσ of P nodule size numbers; FIG. 4 illustrates how the average Vickers hardness HVave varies depending on the average Pave of P nodule size numbers; and FIG. 5 illustrates how the average Vickers hardness HVave varies depending on the standard deviation Pσ of P nodule size numbers. In these figures, data indicated by "♦" are data of samples exhibiting good wire drawability; and data indicated by "x" are data of samples exhibiting poor wire drawability. These results demonstrate that control of the average Pave and standard deviation Pσ of P nodule size numbers so as to satisfy the predetermined relational expressions can give spring steel wire rods with satisfactory wire drawability.

Experimental Example 2

The coils of Test Nos. 1 to 12 obtained in Experimental Example 1 were subjected sequentially to the SV process, annealing as mentioned below, and wire drawing, and wire drawabilities (critical reduction of area in wire drawing and break frequency) of them were evaluated as Test Nos. 22 to 33.

Specifically, the coils were subjected sequentially to the SV process and annealing (softening anneal, at 700° C. to 900° C. for 1 to 2 hours), and drawn into 2-ton coils, and the critical reductions of area in wire drawing (upper limits of reduction of area at which a break occurs) of them were determined. Independently, five 2-ton coils for each of Test Nos. 22 to 33 were subjected sequentially to the surface-shaving (SV) process, the annealing, and wire drawing to diameters of 4.5 to 2.5 mm, and numbers of breaks occurred upon the wire drawing (break frequency) were measured. The evaluation results are indicated in Table 4 below.

TABLE 4

| Test number | Steel | Heat treatment after SV process | Critical reduction of area in wire drawing (%) | Break frequency (number per 10 ton) |
|---|---|---|---|---|
| 22 | A | Annealing | >70 | 1 |
| 23 | B | Annealing | >70 | 1 |
| 24 | C | Annealing | >70 | 2 |
| 25 | D | Annealing | >70 | 1 |
| 26 | E | Annealing | >60 | 0 |
| 27 | F | Annealing | >70 | 1 |
| 28 | G | Annealing | >70 | 1 |
| 29 | H | Annealing | >70 | 0 |
| 30 | I | Annealing | 67 | 2 |
| 31 | J | Annealing | >60 | 0 |
| 32 | K | Annealing | >70 | 1 |
| 33 | L | Annealing | >70 | 1 |

Figure 6:
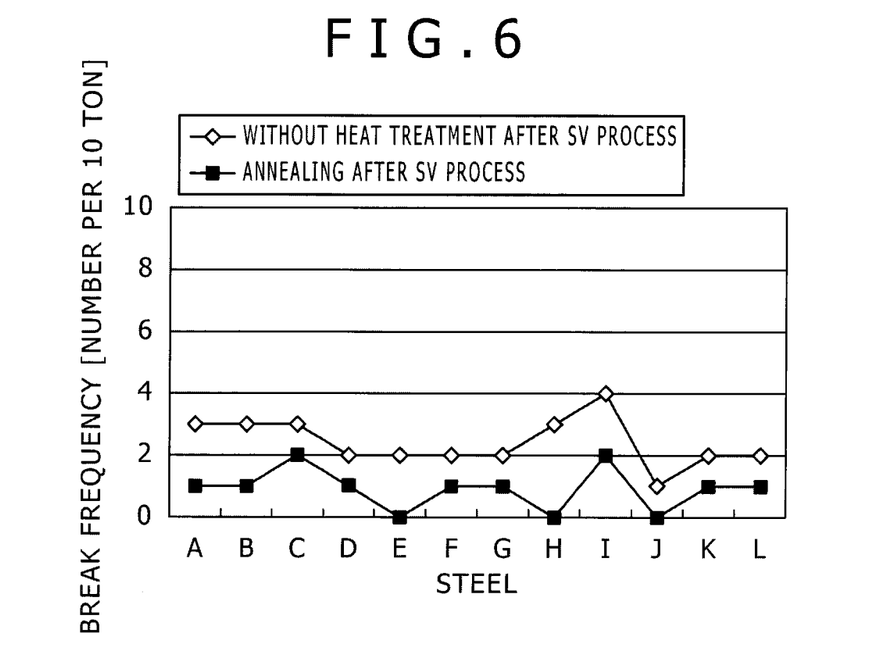
FIG. 6 is a graph illustrating how a break frequency varies depending on the presence or absence of a heat treatment after the SV process.

Table 4 demonstrates that the coils of Test Nos. 22 to 33 each had a high critical reduction of area in wire drawing. FIG. 6 depicts a graph illustrating how the presence or absence of a heat treatment after the SV process affects the break frequency in each of Steels A to L, as synthetic plots of the break frequencies of Test Nos. 22 to 33 in Table 4 and the break frequencies of Test Nos. 1 to 12 in Table 3. FIG. 6 demonstrates that, while the coils of Test Nos. 1 to 12 had sufficiently low break frequencies, coils, when undergone a heat treatment after the SV process and before wire drawing as in Test Nos. 22 to 33, can have further lower break frequencies and have further better wire drawability.

The invention claimed is:

1. A steel wire rod for high-strength springs, as a steel wire rod having been hot-rolled and exhibiting excellent wire drawability, the steel wire rod comprising C in a content of 0.4% to 0.8%; Si in a content of 0.5% to 2.5%; Mn in a content of 0.3% to 2.0%; and Cr in a content of 0.4% to 3.0% and further comprising at least one element selected from the group consisting of V in a content of 0.05% to 0.5%, Nb in a content of 0.05% to 0.5%, Ni in a content of 0.1% to 2.0%, and Mo in a content of 0.1% to 0.5%, in mass percent, wherein the steel wire rod further comprises iron and inevitable impurities, the steel wire rod has a structure mainly including pearlite, the steel wire rod has an average Pave and a standard deviation Pσ of pearlite nodule size numbers, and Pave and Pσ respectively satisfy conditions specified by following Expressions (1) and (2):

$$9.5 \leq Pave \leq 12.0 \qquad (1)$$

$$0.2 \leq P\sigma \leq 0.7 \qquad (2).$$

2. The steel wire rod for high-strength springs of claim 1, wherein the steel wire rod has an average Vickers hardness HVave in a longitudinal direction of the wire rod of 360 or less.

3. The steel wire rod for high-strength springs of claim 1, further comprising Cu in a content of more than 0% and less than or equal to 0.7%.

4. The steel wire rod for high-strength springs of claim 1, further comprising Ti in a content of more than 0% and less than or equal to 0.5%.

5. The steel wire rod for high-strength springs of claim 1, further comprising B in a content of more than 0% and less than or equal to 0.01%.

6. A method for manufacturing the steel wire rod for high-strength springs of claim 1, the method comprising the steps of placing a steel wire rod having been hot-rolled on a cooling conveyor at a placing temperature of 750° C. to 950° C. while coiling the steel wire rod into a coil; rapidly and uniformly cooling the coil on the cooling conveyor down to a temperature of 750° C. or below at a cooling rate of 1° C. or more per second; and subsequently slowly cooling the coil down from slow-cooling starting temperatures in a range of 650° C. to 750° C. both in a coil-dense part and in a coil-sparse part.

7. The manufacturing method of claim 6, wherein the steel wire rod further includes Cu in a content of more than 0% and less than or equal to 0.7%.

8. The manufacturing method of claim 6, wherein the steel wire rod further includes Ti in a content of more than 0% and less than or equal to 0.5%.

9. The manufacturing method of claim 6, wherein the steel wire rod further includes B in a content of more than 0% and less than or equal to 0.01%.

10. The manufacturing method of claim 6, wherein the slow cooling is performed in a slow-cooling zone at a cooling rate V of less than 1° C. per second, and wherein the cooling rate V is specified by following Expression (3):

$$V(° C./second)=(Tin-Tout)/t \qquad (3)$$

wherein Tin represents a temperature (° C.) of the steel wire rod at an inlet of the slow-cooling zone; Tout represents a temperature (° C.) of the steel wire rod at an outlet of the slow-cooling zone; and t represents a slow-cooling zone residence time (second) of the steel wire rod.

11. The manufacturing method of claim 10, wherein the steel wire rod resides in the slow-cooling zone for a residence time t of 30 seconds or longer.

12. A method for manufacturing a high-strength spring, the method comprising forming the steel wire rod of claim 1 into a spring through any one of the following steps (a), (b), and (c), or through the steps (a) and (b) in combination, or through the steps (a) and (c) in combination:
    (a) the step of surface-shaving the steel wire rod without a heat treatment;
    (b) the step of drawing the steel wire rod after the surface-shaving step without patenting; and
    (c) the step of subjecting the steel wire rod after the surface-shaving step to softening anneal or high-frequency heating, and drawing the resulting steel wire rod.

13. The manufacturing method of claim 12, wherein the steel wire rod further includes Cu in a content of more than 0% and less than or equal to 0.7%.

14. The manufacturing method of claim 12, wherein the steel wire rod further includes Ti in a content of more than 0% and less than or equal to 0.5%.

15. The manufacturing method of claim 12, wherein the steel wire rod further includes B in a content of more than 0% and less than or equal to 0.01%.

16. A high-strength spring manufactured by the method of claim 12.

17. A high-strength spring manufactured by the method of claim 13.

18. A high-strength spring manufactured by the method of claim 14.

19. A high-strength spring manufactured by the method of claim 15.

\* \* \* \* \*